(12) United States Patent
Groh et al.

(10) Patent No.: US 7,537,725 B2
(45) Date of Patent: May 26, 2009

(54) METHOD FOR MAKING A COMPOSITIONALLY GRADED GAS TURBINE DISK

(75) Inventors: Jon Raymond Groh, Loveland, OH (US); Eric Allen Ott, Cincinnati, OH (US); Robert Edward Schafrik, Cincinnati, OH (US); Daniel Donald Krueger, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 501 days.

(21) Appl. No.: 11/229,823

(22) Filed: Sep. 19, 2005

(65) Prior Publication Data

US 2006/0263231 A1  Nov. 23, 2006

Related U.S. Application Data

(63) Continuation-in-part of application No. 11/130,764, filed on May 17, 2005.

(51) Int. Cl.
*B22F 7/00* (2006.01)
*B23P 15/04* (2006.01)

(52) U.S. Cl. .............. 419/6; 419/41; 419/42; 148/675; 148/677; 148/409; 29/889.2; 29/889.23

(58) Field of Classification Search .............. 419/6
See application file for complete search history.

(56) References Cited

U.S. PATENT DOCUMENTS

| | | | | |
|---|---|---|---|---|
| 3,780,418 A | * | 12/1973 | Hurst | ............... 419/42 |
| 4,825,522 A | * | 5/1989 | Iwai et al. | ............ 29/889.2 |
| 4,851,190 A | | 7/1989 | Bowen et al. | |
| 4,900,635 A | | 2/1990 | Bowen et al. | |
| 5,038,014 A | | 8/1991 | Pratt et al. | |
| 5,077,090 A | | 12/1991 | Sawyer | |
| 5,302,414 A | | 4/1994 | Alkhimov et al. | |
| 5,795,626 A | | 8/1998 | Gabel et al. | |
| 6,375,877 B2 | | 4/2002 | Lauf et al. | |

OTHER PUBLICATIONS

Maurice F. Amateau et al., "High-Velocity Particle Consolidation Technology," IMAST Quarterly 2000, No. 2, pp. 3-6 (2000).
Howard Gabel, "Kinetic Metallization Compared with HVOF", Advanced Materials and Processes, 7 pp. (May 2004).

* cited by examiner

*Primary Examiner*—Roy King
*Assistant Examiner*—Christopher Kessler
(74) *Attorney, Agent, or Firm*—McNees Wallace & Nurick, LLC

(57) ABSTRACT

A compositionally graded gas turbine disk is made by placing a cylindrically symmetric slip case concentrically into an interior of a cylindrically symmetric outer container. A first nickel-base superalloy powder is loaded into a radially inner first portion of the interior and a second nickel-base superalloy powder is loaded into a radially outer second portion of the interior. The slip case is removed so that the first nickel-base superalloy powder and the second nickel-base superalloy powder contact in the transition region and form a non-compacted powder mass. The non-compacted powder mass is processed into a gas turbine disk, typically by compacting the non-compacted powder mass to form a compacted powder mass, and thereafter heat treating the compacted powder mass.

19 Claims, 3 Drawing Sheets

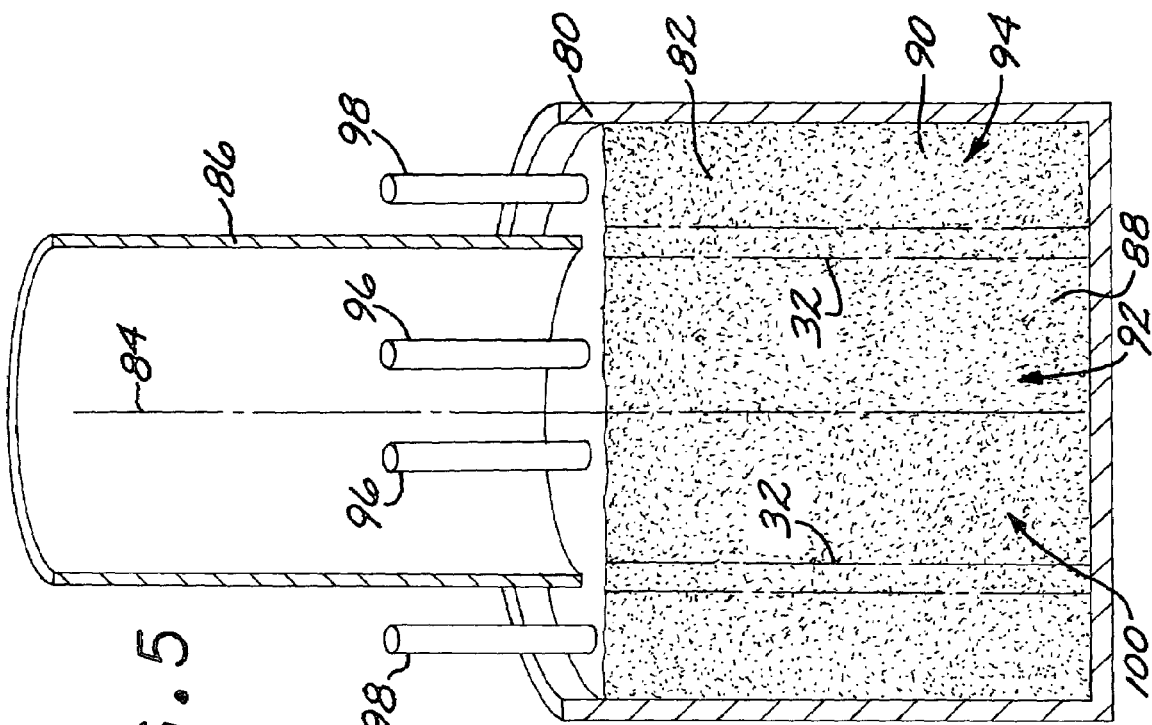
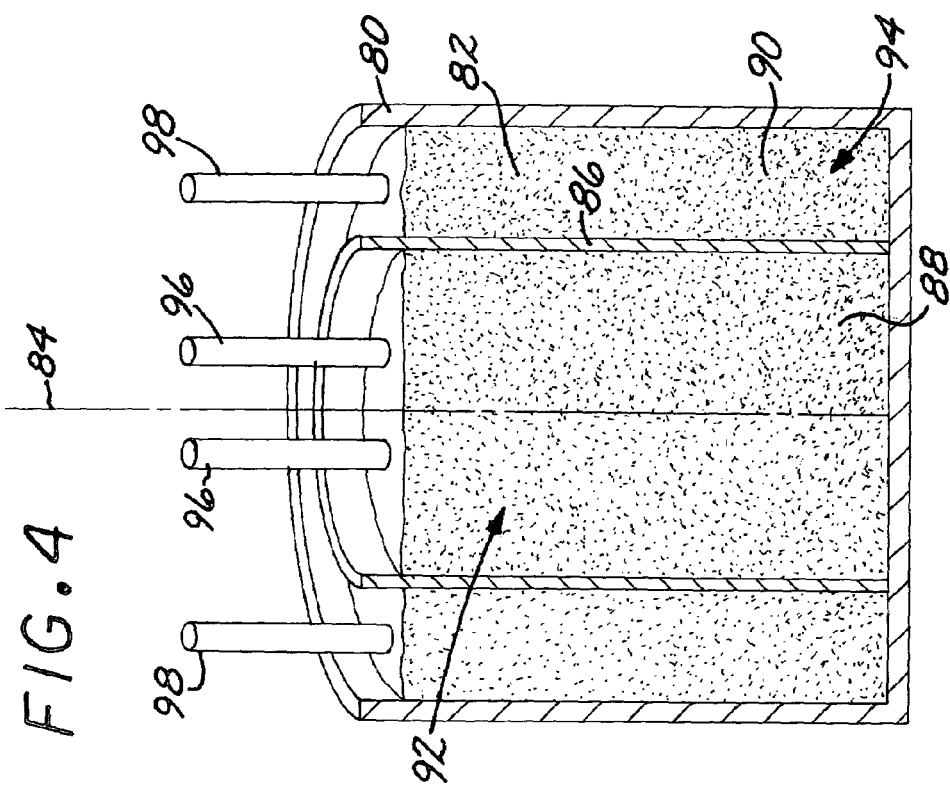

METHOD FOR MAKING A COMPOSITIONALLY GRADED GAS TURBINE DISK

This application is a continuation in part of application Ser. No. 11/130,764, filed May 17, 2005 for which priority is claimed and whose disclosure is incorporated by reference in its entirety.

This invention relates to the making of a gas turbine disk and, more particularly, to the making of a gas turbine disk having a composition that varies radially with position in the gas turbine disk.

BACKGROUND OF THE INVENTION

In an aircraft gas turbine (jet) engine, air is drawn into the front of the engine, compressed by a shaft-mounted compressor, and mixed with fuel. The mixture is burned, and the hot combustion gases are passed through a turbine mounted on the same shaft. The flow of combustion gas turns the turbine by impingement against an airfoil section of the turbine blades and vanes, which turns the shaft and provides power to the compressor and to the fan. In a more complex version of the gas turbine engine, the compressor and a high-pressure turbine are mounted on one shaft, and the fan and a low-pressure turbine are mounted on a separate shaft. The hot exhaust gases flow from the back of the engine, driving it and the aircraft forward.

The turbine blades, compressor blades, and fan blades are mounted on, or extend from, respective gas turbine disks. The gas turbine disks rotate at a high rate on their shaft or shafts. During service, the various parts of the gas turbine disks are subjected to different conditions of loadings and temperatures. For example, the high-pressure and low-pressure turbine disks, upon which the turbine blades are mounted, experience low-cycle-fatigue loadings and high tensile stress at relatively lower temperatures near their bores, and high tensile stress and creep loadings at relatively higher temperatures near their rims.

The turbine disks are made of nickel-base superalloys, but no single nickel-base superalloy having a single grain size and heat-treatment state provides optimum performance under these different conditions. Various techniques have been proposed for varying the properties of the turbine disk as a function of radial position. For example, it has been suggested to vary the composition of the alloy as a function of radial position, and/or to vary the heat treat temperatures as a function of radial position to vary the grain size and mechanical properties.

There remains a need for a practical approach to making the turbine disks utilizing these principles, and the present invention fulfills this need.

SUMMARY OF THE INVENTION

The present approach provides a method for making a turbine disk whose composition is graded radially. The approach is compatible with existing production technology, so that it may readily be used in a production setting. The composition may be varied to achieve a wide range of structures and properties through either spatially uniform or spatially nonuniform heat treatments.

A method for making a compositionally graded gas turbine disk comprises the steps of providing an outer container having an interior, and placing a slip case into the interior of the outer container to define a first portion of the interior, a second portion of the interior, and a transition region between the first portion and the second portion. A first powder having a first composition is loaded into the first portion of the interior, and a second powder having a second composition different from the first composition is loaded into the second portion of the interior. The method further includes removing the slip case so that the first powder and the second powder contact at the transition region and form a non-compacted powder mass, and processing the non-compacted powder mass into the gas turbine disk.

In the preferred approach, the outer container is a cylindrically symmetric outer container, and the slip case is cylindrically symmetric (but of smaller cylindrical diameter) and concentric with the outer container. There may be a single cylindrically symmetric slip case that divides the outer container into two interior volumes, or additional cylindrically symmetric slip cases that divide the outer container into a center volume and a series of annular volumes. The method is preferably practiced using a nickel-base superalloy first powder, and a nickel-base superalloy second powder different from the first powder. However, the approach may be practiced with other types of powders, such as titanium alloy powders, aluminum alloy powders, or mixtures.

The processing of the non-compacted powder mass to the final gas turbine disk includes all necessary steps. Such processing typically includes compacting the gas turbine disk preform to densify the non-compacted powder mass. The compacting preferably is by hot isostatic pressing or extrusion, or both. The processing may also include upset forging the compacted gas turbine disk preform, and usually includes rough and final machining. There may also be other steps such as surface finishing and surface coating of the gas turbine disk preform.

As part of the further processing, there is preferably a heat treating of the gas turbine disk preform as may be appropriate for the first and second compositions. The heat treating processing step may be performed before the machining processing step, or in the reverse order, or with portions of the heat treating and machining steps interspersed. In the preferred application of a turbine disk (as distinct from a compressor disk or a fan disk), the two material compositions are chosen to be two different nickel-base superalloys. The first-composition nickel-base superalloy (placed within the center volume of the slip case) is preferably selected to have superior low-cycle fatigue and tensile properties at moderate operating temperatures, after suitable processing and heat treatment. The second-composition nickel-base superalloy (placed between the slip case and the outer container) is preferably selected to have superior creep and elevated-temperature tensile properties, after suitable processing and heat treatment. Examples of suitable materials include Rene 104 or Rene 95 for the first-composition nickel-base superalloy, and Rene 88 for the second-composition nickel-base superalloy.

The heat treatment may be intentionally spatially nonuniform or intentionally substantially spatially uniform. Such spatially non-uniform heat treatment may be accomplished, for example, by chilling the inner bore of the gas turbine disk preform while it is otherwise undergoing spatially uniform heat treatment. The heat treatment is, however, preferably spatially uniform, as a spatially uniform heat treatment is less expensive to perform than a controlled spatially varying heat treatment. Because of the different compositions of the two nickel-base superalloys, the use of a spatially uniform heat treatment leads to different properties in the center portion of the final gas turbine disk and the rim portion of the final gas turbine disk.

In the case of the preferred nickel-base superalloys, for example, the first composition (placed near the radial center of the gas turbine disk) may be Rene 104, having a high-temperature solvus at about 2110° F., and the second composition (placed near the rim of the gas turbine disk) may be Rene 88, having a high-temperature solvus at about 2035° F. A spatially uniform isothermal heat treatment within the range of 2035-2110° F. results in a subsolvus heat treatment of the Rene 104, producing a finer grain size preferred for low-cycle fatigue performance, and a supersolvus solution heat treatment of the Rene 88, producing a coarser grain size preferred for creep and high-temperature tensile strength. More preferably, the spatially uniform isothermal heat treatment is in the range of 2050-2080° F. to allow for internal variations in the furnace temperature and to provide a safety factor in the heat treatment. The heat treatment is then continued with a lower-temperature aging that produces a distribution of gamma prime precipitates in a gamma matrix of each composition.

In a particularly preferred approach, a method for making a compositionally graded gas turbine disk comprises the steps of providing a cylindrically symmetric outer container having an interior, and placing a cylindrically symmetric slip case concentrically into the interior of the outer container to define a radially inner first portion of the interior, a radially outer second portion of the interior, and a transition region between the radially inner first portion and the radially outer second portion. A first nickel-base superalloy powder of a first composition is loaded into the radially inner first portion of the interior, and a second nickel-base superalloy powder of a second composition different from the first composition is loaded into the radially outer second portion of the interior. The slip case is removed so that the first nickel-base superalloy powder and the second nickel-base superalloy powder contact at the transition region and form a non-compacted powder mass. The non-compacted powder mass is processed into a gas turbine disk by compacting the non-compacted powder mass to form a compacted powder mass, and thereafter heat treating the compacted powder mass. Other compatible features discussed herein may be used with this approach.

The present technique provides a commercially practical approach to fabricating a gas turbine disk having a spatially varying composition. The compositions are selected to provide the optimum mechanical properties and microstructures responsive to the different performance requirements of the different regions of the gas turbine disk. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a schematic sectional view of the assembly of outer container, slip case, and powder, prior to removal of the slip case; and FIG. 5 is a schematic sectional view of the assembly of outer container, slip case, and powder, after removal of the slip case

DETAILED DESCRIPTION OF THE INVENTION

Figure 1:
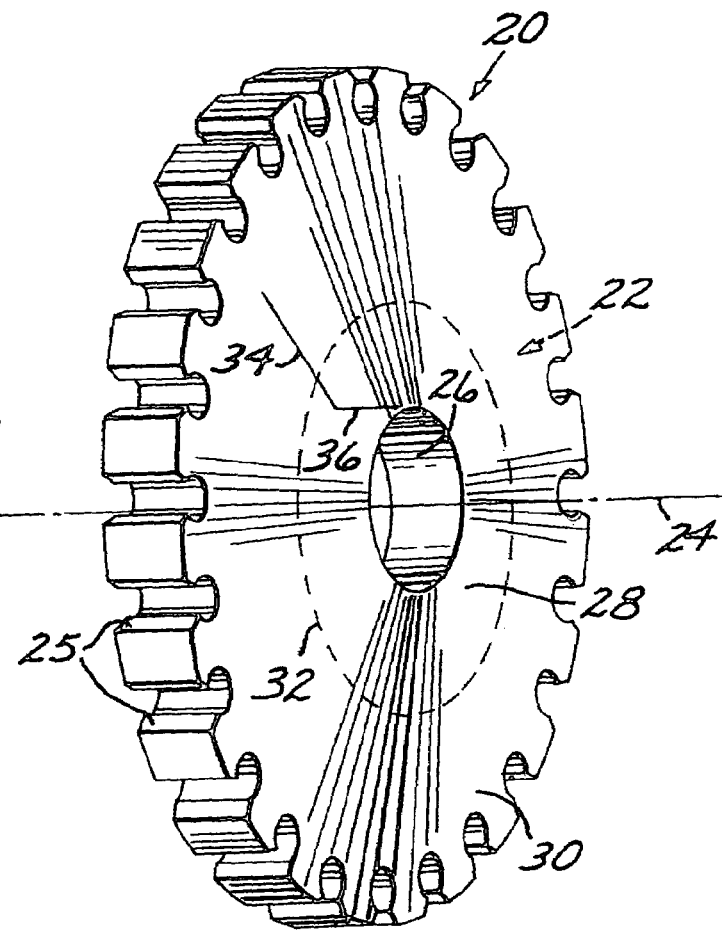
FIG. 1 is a perspective view of a gas turbine disk.

FIG. 1 depicts a gas turbine disk 20 for a gas turbine engine. The gas turbine disk 20 may be a turbine disk, a compressor disk, or a fan disk. The preferred application is a turbine disk, and the following discussion will focus on the turbine disk application.

The illustrated gas turbine disk 20 has a body 22 that is generally cylindrically symmetric about a central axis 24. The gas turbine disk 20 may have a hollow bore 26 at its radial center as illustrated, or it may be solid. (As used herein, "radial" refers to a radial direction 34 perpendicular to the central axis 24, and "axial" refers to an axial direction 36 parallel to the central axis 24.) The gas turbine disk 20 has slots 25 on its periphery (i.e., rim) in which the attachment portions of turbine blades (not shown) are received. For the purposes of the present discussion, the body 22 may be considered as including a radially (relative to the central axis 24) inner segment 28 and a radially outer segment 30 having a composition different from that of the radially inner segment 28. Such a gas turbine disk 20 is termed a "compositionally graded gas turbine disk." There is a transition region 32 between the radially inner segment 28 and the radially outer segment 30.

Figure 2:
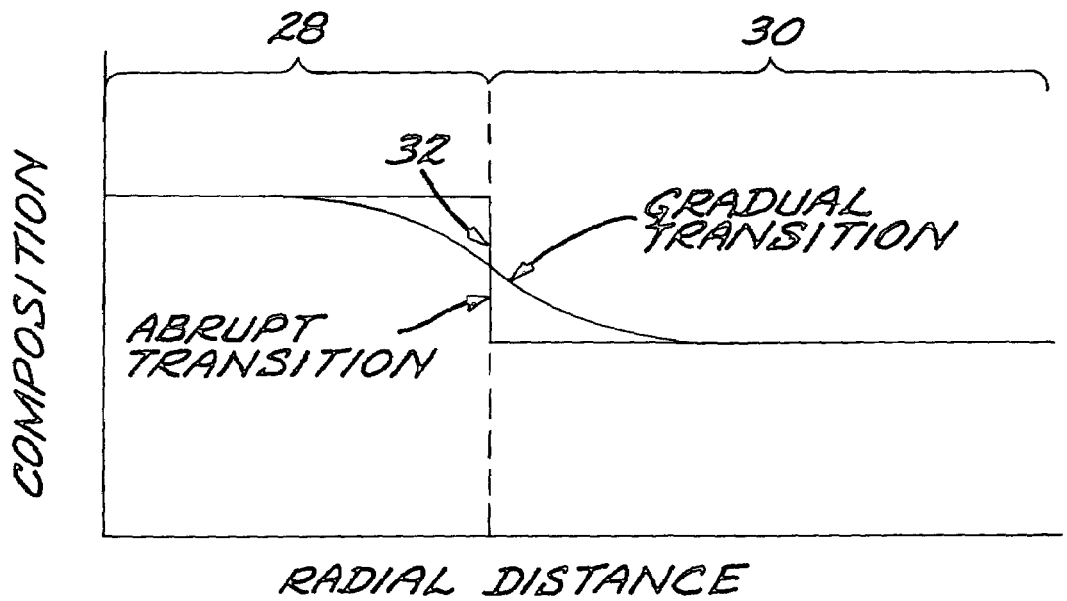
FIG. 2 is a schematic graph of composition as a function of distance.

The transition region 32 may be abrupt, but more preferably is somewhat gradual and is spread over a radial distance to avoid thermal strains, crack-initiation sites, and other discontinuous characteristics associated with an abrupt compositional change. FIG. 2 schematically illustrates the preferred radially outward gradual-transition composition change at the transition region 32, as compared with an abrupt-transition composition change. Either approach may be prepared within the scope of the present approach, but the gradual transition is preferred. Thus, in the preferred gas turbine disk 20 according to the present approach, the radially inner segment 28 has a fixed first composition, the radially outer segment 30 has a fixed second composition, and there is a gradual transition between the first composition and the second composition through the transition region 32. The slots 25 are machined into the radially outer segment 30 at the periphery of the gas turbine disk 20.

Figure 3:
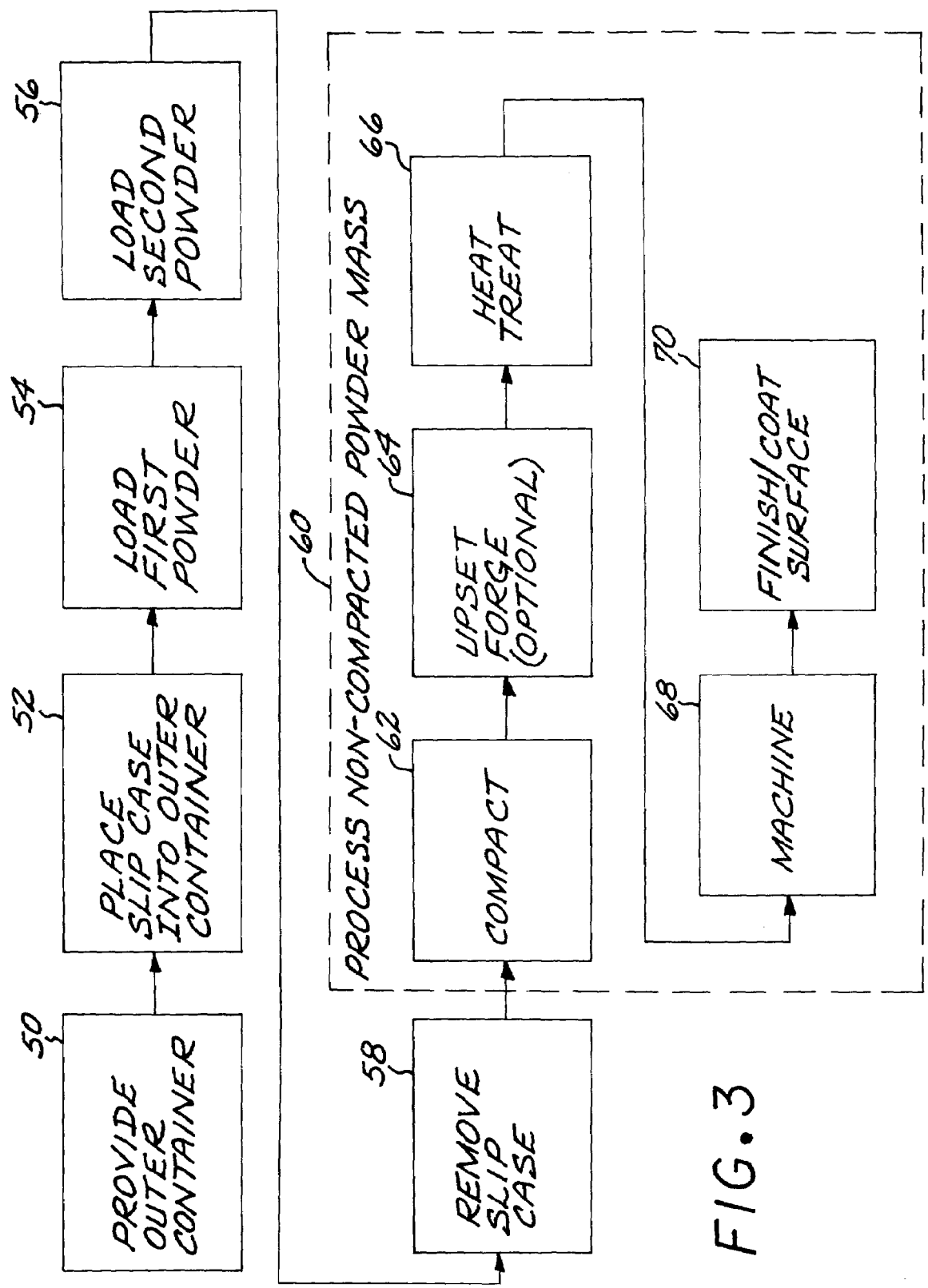
FIG. 3 is a block flow diagram of a method for making a gas turbine disk.

FIG. 3 illustrates the steps in the method of making the gas turbine disk 20. FIGS. 4 and 5 are schematic views of the manufacturing assembly at two points in the fabrication process. Referring to FIGS. 3 and 4, an outer container 80 with an interior 82 is provided, step 50. Preferably, the outer container 80 is substantially cylindrically symmetric about a cylindrical axis 84. A cylindrically symmetric slip case 86 is placed concentrically about the cylindrical axis 84 and in the interior 82 of the outer container 80, step 52. The slip case 86 is cylindrically symmetric but with a smaller cylindrical diameter than the outer container 80. The outer container 80 and the slip case 86 together define a radially inner first portion 88 of the interior 82, a radially outer second portion 90 of the interior 82, and the transition region 32 (see FIG. 5) between the radially inner first portion 88 and the radially outer second portion 90.

In the preferred approach, a first nickel-base superalloy powder 92 having a first composition is loaded into the radially inner first portion 88 of the interior 82, step 54. A second nickel-base superalloy powder 94 having a second composition different from the first composition is loaded into the radially outer second portion 90 of the interior 82, step 56.

(The order of steps 54 and 56 may be reversed.) Respective fill tubes 96 and 98 may be used to facilitate the loading. The fill tubes 96 and 98 also aid in venting any gas that would otherwise be entrapped within the powders 92 and 94. In this preferred approach used to fabricate a turbine disk, the powders are both nickel-base superalloys. A nickel-base superalloy is a nickel-base alloy having more nickel than any other element, and which may be strengthened by the precipitation of gamma prime or a related phase during a subsequent heat treatment.

The slip case 86 is removed, step 58, as depicted in FIG. 5. Removal of the slip case 86 causes the first nickel-base superalloy powder 92 and the second nickel-base superalloy powder 94 to mix together in the transition region 32, eventually leading to the gradual transition in composition shown in FIG. 2. The intermixing of the powders 92 and 94 may be lessened by removing the slip case 86 slowly and gently so as to disturb the powders 92 and 94 as little as possible. The intermixing of the powders 92 and 94 may be increased by removing the slip case 86 so as to disturb the powders 92 and 94 a larger amount, by agitating the outer container 80 after the slip case 86 is removed, or by agitating the powders 92 and 94 directly, as with ultrasonic energy applied to the wall of the outer container 80. The degree of intermixing is selected according to the desired extent and profile of the gradual transition shown in FIG. 2. The slip case 86 may be a solid piece that is physically withdrawn as shown in FIG. 5, or it may be a material that remains in place and is volatilized (i.e., removed) during heating. For example, the slip case 86 may be a volatile polymer that is fully vaporized with no residual organic material left in the powder mass. Whatever the nature of the slip case 86, the result of removing the slip case is a non-compacted powder mass 100 residing within the outer container 80.

The non-compacted powder mass 100 is processed into the compositionally graded gas turbine disk 20, step 60. FIG. 3 depicts some of the steps employed to perform this processing 60. The non-compacted powder mass 100 is compacted to form a compacted powder mass, step 62. The compacting 62 may be performed by any operable approach. Preferred compacting processes 62 include hot isostatic pressing, canned extrusion, or a combination of the two techniques. Optionally but preferably, the compacted powder mass is thereafter upset forged, step 64, to produce the flat, disk shape that is final processed into the gas turbine disk 20.

For most practical alloys, including the nickel-base superalloys, the compacted powder mass is heat treated, step 66. The heat treating 66 may be intentionally spatially non-uniform, but this is not preferred due to its complexity. The heat treating is preferably substantially spatially uniform, within the limits imposed by thermal diffusion in heating and cooling thick sections. By proper selection of the first composition and the second composition, the spatially uniform heat treatment may be used to achieve significantly different properties in the radially inner segment 28 and the radially outer segment 30. As an example of this latter approach, the first composition and the second composition, such as two different nickel-base superalloys, are selected so that their recommended heat treatments are compatible with a single spatially uniform heat treatment process 66. The selection of the compositions is made such that the first composition and the second composition may both be effectively heat treated in a common heat-treatment sequence in which the temperatures are substantially uniform throughout the gas turbine disk (again within the constraints of thermal diffusion in thick sections), but achieve different final properties of the two compositions due to the different compositions. As used herein, a "common heat-treatment sequence" means that the radially inner segment 28 and the radially outer segment 30 are subjected to the same heat treatment temperature-time profile (within the limitations of thermal diffusion through thick sections).

In an example, the inner-segment material is Rene 104, having a high-temperature solvus at about 2110° F., and the outer-segment material is Rene 88, having a high-temperature solvus at about 2035° F. Rene 104 has a nominal composition, in weight percent, of 20.6 percent cobalt, 13.0 percent chromium, 3.4 percent aluminum, 3.70 percent titanium, 2.4 percent tantalum, 0.90 percent niobium, 2.10 percent tungsten, 3.80 percent molybdenum, 0.05 percent carbon, 0.025 percent boron, 0.05 percent zirconium, up to 0.5 percent iron, balance nickel and minor impurity elements. An alternative to Rene 104 is Rene 95, which has a nominal composition, in weight percent, of about 13 percent chromium, about 8 percent cobalt, about 3.5 percent molybdenum, about 3.5 percent tungsten, about 3.5 percent niobium, about 2.5 percent titanium, about 3.5 percent aluminum, about 0.01 percent boron, about 0.05 percent zirconium, about 0.06 percent carbon, balance nickel and incidental impurities. Rene 88 has a nominal composition, in weight percent, of 13 percent cobalt, 16 percent chromium, 4 percent molybdenum, 3.7 percent titanium, 2.1 percent aluminum, 4 percent tungsten, 0.75 percent niobium, 0.02 percent boron, 0.04 percent zirconium, and 0.04 percent carbon, balance nickel and minor impurity elements. A spatially uniform isothermal heat treatment in the preferred range of 2050-2080° F. results in subsolvus heat treatment of the Rene 104, producing a finer grain size preferred for good low-cycle fatigue performance and good tensile strength at moderate temperatures, and a supersolvus solution heat treatment of the Rene 88, producing a coarser grain size preferred for good creep and high-temperature tensile strength. The heat treatment 66 is continued with a controlled quench and a lower-temperature age that produces a distribution of gamma prime precipitates in a gamma matrix of each composition.

The processing 60 also typically includes rough and final machining, step 68, to define the general surface shape of the final gas turbine disk 20, and also to form specific features such as the bore 26, where present, and the peripheral axial slots 25.

Surface finishing and/or coating 70 may also be employed. Examples include working the surface as by shot peening, and applying protective surface coatings such as those known in the art. Any other appropriate final processing steps may be used as well. The present approach is compatible with such other final processing steps.

In the processing 60, the illustrated steps may be performed in any operable sequence, or there may be an intermixing of the steps. Upset forging 64, where used, normally follows compaction 62. However, the heat treat step 66 may occur after forging 64, interspersed with the substeps of the forging operation 64, or after machining 68, interspersed with the substeps of the machining operation 68, or in any other operable sequence. Machining 68 may occur at whatever point of the processing that it is needed. The surface finishing 70 normally occurs at or near the end of the processing 60.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for making a compositionally graded gas turbine disk, comprising the steps of
providing an outer container having an interior;
placing a slip case into the interior of the outer container to define a first portion of the interior, a second portion of the interior, and a transition region between the first portion and the second portion;
loading a first powder into the first portion of the interior, wherein the first powder has a first composition;
loading a second powder into the second portion of the interior, wherein the second powder has a second composition different from the first composition;
removing the slip case so that the first powder and the second powder contact at the transition region and form a non-compacted powder mass; thereafter
agitating the first powder and the second powder to intermix the first powder and the second powder at the transition region; and thereafter
processing the non-compacted powder mass into the gas turbine disk.

2. The method of claim 1, wherein the step of providing the outer container includes the step of
providing a cylindrically symmetric outer container, and wherein the step of placing the slip case includes the step of
providing a cylindrically symmetric slip case.

3. The method of claim 1, wherein the step of loading the first powder includes the step of
providing a nickel-base superalloy first powder.

4. The method of claim 1, wherein the step of loading the second powder includes the step of
providing a nickel-base superalloy second powder.

5. The method of claim 1, wherein the step of processing includes the step of
compacting the non-compacted powder mass.

6. The method of claim 1, wherein the step of processing includes the step of
compacting the non-compacted powder mass by hot isostatic pressing or extrusion or both.

7. The method of claim 1, wherein the step of processing includes the step of
compacting the non-compacted powder mass to form a compacted powder mass, and thereafter
upset forging the compacted powder mass.

8. The method of claim 1, wherein the step of processing includes the step of
compacting the non-compacted powder mass to form a compacted powder mass, and
heat treating the compacted powder mass with a spatially non-uniform heat treatment.

9. The method of claim 1, including the additional steps of
selecting the first powder and the second powder so that both may be effectively heat treated in a common spatially uniform heat-treatment sequence,
compacting the non-compacted powder mass to form a compacted powder mass, and
heat treating the compacted powder mass with the common spatially uniform heat-treatment sequence.

10. The method of claim 1, including the additional steps of
selecting the first powder of a first nickel-base superalloy composition and the second powder of a second nickel-base superalloy composition such that the first nickel-base superalloy composition and the second nickel-base superalloy composition may both be effectively heat treated in a common heat-treatment sequence,
compacting the non-compacted powder mass to form a compacted powder mass, and
heat treating the compacted powder mass with the common heat-treatment sequence.

11. A method for making a compositionally graded gas turbine disk, comprising the steps of
providing a cylindrically symmetric outer container having an interior;
placing a cylindrically symmetric slip case concentrically into the interior of the outer container to define a radially inner first portion of the interior, a radially outer second portion of the interior, and a transition region between the radially inner first portion and the radially outer second portion;
loading a first nickel-base superalloy powder into the radially inner first portion of the interior, wherein the first powder has a first composition;
loading a second nickel-base superalloy powder into the radially outer second portion of the interior, wherein the second powder has a second composition different from the first composition;
removing the slip case so that the first nickel-base superalloy powder and the second nickel-base superalloy powder contact at the transition region and form a non-compacted powder mass; thereafter
agitating the first powder and the second powder to intermix the first powder and the second powder at the transition region; and thereafter
processing the non-compacted powder mass into the gas turbine disk, wherein the step of processing includes the steps of
compacting the non-compacted powder mass to form a compacted powder mass, and thereafter
heat treating the compacted powder mass.

12. The method of claim 11, wherein the step of compacting includes the step of
compacting the non-compacted powder mass by hot isostatic pressing or extrusion or both.

13. The method of claim 11, wherein the step of processing includes the step of
upset forging the compacted powder mass.

14. The method of claim 11, wherein the step of heat treating includes the step of
heat treating the compacted powder mass with a spatially non-uniform heat treatment.

15. The method of claim 11, including the additional step of
selecting the first nickel-base superalloy powder and the second nickel-base superalloy powder so that both may be effectively heat treated in a common spatially uniform heat-treatment sequence, and wherein the step of heating treating includes the step of
heat treating the compacted powder mass with the common spatially uniform heat-treatment sequence.

16. The method of claim 1, wherein the step of agitating includes agitating the powders to intermix them at the transition region by agitating the outer container.

17. The method of claim 1, wherein the step of agitating includes agitating the powders to intermix them at the transition region by agitating the powders directly by applying ultrasonic energy to the wall of the outer container.

18. The method of claim 11, wherein the step of agitating includes agitating the powders to intermix them at the transition region by agitating the outer container.

19. The method of claim 11, wherein the step of agitating includes agitating the powders to intermix them at the transition region by agitating the powders directly by applying ultrasonic energy to the wall of the outer container.

* * * * *